Oct. 21, 1924.
R. C. PIERCE
TIRE BEAD CONSTRUCTION
Filed Jan. 27, 1922
1,512,795
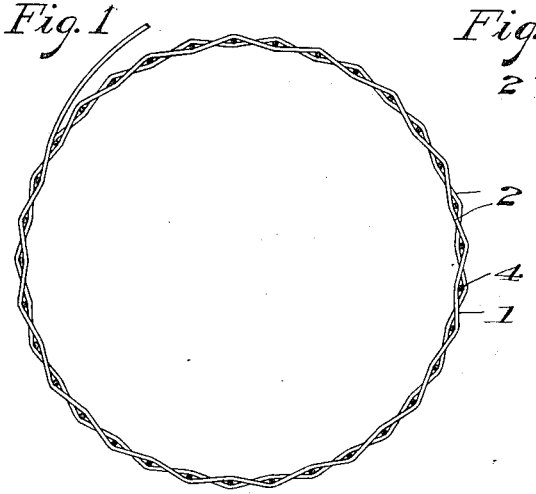
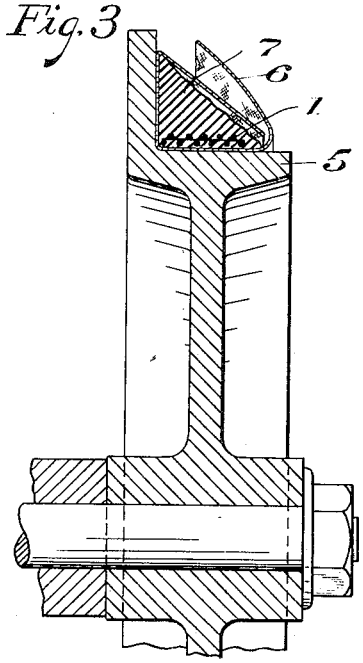
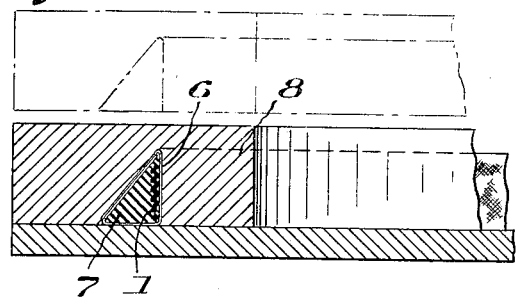
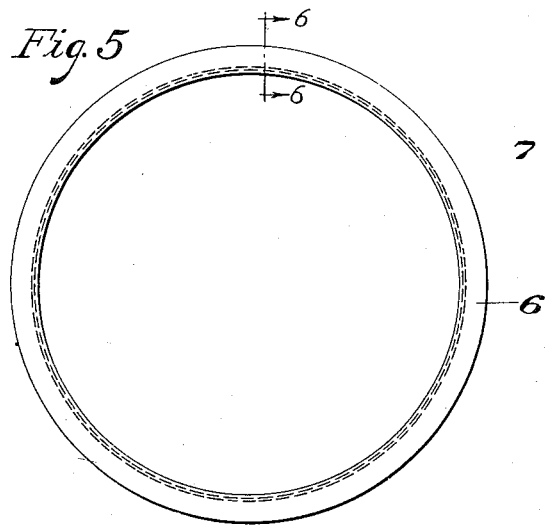
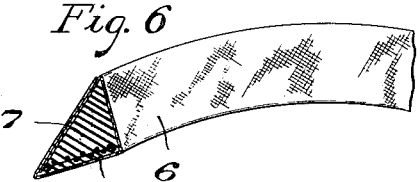
Inventor
R. C. Pierce.
By
Atty.

Patented Oct. 21, 1924.

1,512,795

UNITED STATES PATENT OFFICE.

ROBERT C. PIERCE, OF AKRON, OHIO, ASSIGNOR TO JOHN R. GAMMETER, OF AKRON, OHIO.

TIRE-BEAD CONSTRUCTION.

Application filed January 27, 1922. Serial No. 532,096.

*To all whom it may concern:*

Be it known that I, ROBERT C. PIERCE, a citizen of the United States, residing at Akron, in the county of Summit, State of Ohio, have invented certain new and useful Improvements in Tire-Bead Constructions, of which the following is a specification.

This invention relates to pneumatic tires and especially to the type of tire which has embedded in the beads thereof metallic reinforcements which render the beads relatively non-stretchable or inextensible. In the usual form of tires of this type, known in the art as straight-side tires, the reinforcement has been of two distinct types, one being in the nature of an endless cable or hoop, and the other being in the form of a metallic ribbon or tape which is wrapped about in the bead a number of times to give it required strength.

It is with the latter type of reinforcement that this invention has to do, it being the purpose to improve upon existing type of beads; to render the same more easy of manufacture, and with less extensibility or stretch. It is also a purpose of my invention to improve upon a type of wire reinforcement such as devised by me and shown and described in my prior application Serial No. 530,801 filed January 21, 1922.

Before my inventions in improved wire tape construction for bead manufacture, it was customary to construct the tape or ribbon of wire from a plurality of small strands which were braided back and forth across the entire width of the tape. While this form of wire possesses the required flexibility for the manufacture of beads, it is somewhat stretchable longitudinally, which is an objectionable feature and which often causes the rubber coating or insulation with which the reinforcement is covered, to work out of the wire structure. In addition to this fact it is manufactured on complicated and expensive machinery which increases the cost of manufacture and as the machinery is subject to breakage, and the wire is often broken, being constantly twisted and under tension, the delays due to these causes decrease the capacity of the machine and increase the expense of manufacture. Even when the machines are operated without any breakdowns, the production of wire is slow and expensive.

It has been the purpose of this invention to construct a bead wire which shall be strong and flexible for embodiment in a tire bead, but which shall have no stretchability and which is adaptable for manufacture by machinery in a simpler, faster, and more economical manner than is possible with the braiding machines in use at the present time. It is a further object of my invention to construct a wire reinforcement which is in the form of a short cylinder as a ring or hoop, so that the wrapping and splicing as with former types of bead wire will be avoided.

These and other objects have led to the construction of bead wire as shown in the accompanying drawings and described in the specification, it being apparent that, when the principles of the invention are understood, it may be carried out by modifications and variations such as fall within the scope of the invention and the claims appended hereto.

In the drawings:

Fig. 1 is a side elevation of a bead ring or wire core in the process of manufacture;

Fig. 2 is a view of a fragment thereof showing the manner in which it is secured;

Fig. 3 is a section through the form on which a bead is built up;

Fig. 4 is a view showing the bead in the process of semi-vulcanization;

Fig. 5 is a side elevation of a complete bead; and

Fig. 6 is a perspective view, the bead being cut on the line 6—6 of Fig. 5.

The bead reinforcement forming the subject-matter of this invention is in the form of a hoop or ring 1, which is endless as shown in Fig. 1, being flat or ribbon-like in cross-section. The ribbon or hoop is formed from a single flexible wire or strand 2 which is bent around in a plurality of parallel convolutions as shown in Fig. 2 until the desired number have been laid side by side. When the required number of turns have been taken the ends of the wire may be brought together by crossing them over the tape and connecting them in any suitable way. The ends may be brazed, welded, or soldered, or a sleeve such as shown in Fig. 2 at 3, may be placed over the ends of the wire, with or without the other means of making a permanent joint.

In order to hold the wires together and keep the ring intact, any suitable means may be employed. I have here shown a binding wire or tie 4 which may be woven back and forth across the wires serving to keep the several turns in close relationship and preserving the ring or cylindrical form of the wire. This binding wire is preferably of considerably lighter gage than the main or circumferential wire and is interlaced across the main wire a sufficient number of times to carry out its proper function.

This wire ring or band forms the subject-matter of this invention, and it will be apparent that it possesses strength and flexibility suitable for the manufacture of the tire bead. It has no extensibility, it is made from a single strand of wire, and is simple and easy to manufacture.

Figs. 3 and 4 show the manner in which a tire bead is constructed from this reinforcement. A form such as shown in Fig. 3 at 5 is provided on which the hoop or ring 1 is placed with a fabric covering 6 and a mass of rubber composition 7. While only one hoop or ring is shown, more may be placed on the form if desired for the purpose of additional strength. When the bead has been partially formed and the wrapper 6 rolled into place, it is put in a mold 8 and partially vulcanized. This gives a completed bead, as shown in Figs. 5 and 6, which is now ready to be incorporated in a tire casing.

Changes and modifications may be made in the method of construction of the wire reinforce, it being believed that the ring or short cylindrical body formed from a single wire constitutes an advance in the art over prior forms of wire reinforce.

Claims:

1. A tire bead containing a metallic reinforce, comprising an endless tape formed from a single wire laid in a plurality of parallel convolutions to form a short cylindrical body.

2. A metallic reinforcement for use in tire manufacture, comprising an endless ring formed from a single wire laid in a plurality of parallel convolutions to form a flat tape, and means to connect the ends of the wire together.

3. A tire bead comprising a metallic reinforcement in the form of an inextensible endless band which is flat in cross-section and formed from a single wire strand.

4. A tire bead comprising a metallic reinforcement in the form of an inextensible endless ring, flat in cross-section and comprising a single wire wrapped in a number of parallel convolutions.

5. A tire bead comprising a metallic reinforcement in the form of an endless ring, flat in cross-section and comprising a single wire wrapped in a number of parallel convolutions, the ends of the wire being permanently connected.

6. A tire bead comprising a short cylindrical band, said band being formed from a flat tape constituted of a number of turns of a single wire laid side by side.

7. A tire bead comprising a short cylindrical band, said band being formed from a flat tape constituted of a number of turns of a single wire laid side by side, the ends of the wire being crossed over the band and permanently connected.

8. A wire reinforcement for tire beads, comprising a single wire wrapped in a plurality of parallel convolutions, and a tying element interwoven with the said convolutions and holding them in place.

9. A wire reinforcement for tire beads, comprising a single wire laid in a plurality of parallel convolutions, and a second wire interwoven across the several convolutions and serving to hold them in band form.

10. A wire reinforcement for tire beads, comprising a single wire laid in a plurality of parallel convolutions, the ends of the wire being permanently connected together, and a second wire interwoven across the several convolutions and serving to hold them in place.

ROBERT C. PIERCE.